(12) United States Patent
Falc et al.

(10) Patent No.: US 11,547,934 B2
(45) Date of Patent: Jan. 10, 2023

(54) GAME CONTROLLER COMPRISING AT LEAST ONE PIVOTING CONTROL MEMBER WITH A MODIFIABLE STOP ANGLE

(71) Applicant: NACON, Fretin (FR)

(72) Inventors: Alain Falc, Fretin (FR); Antoine Vandekerckhove, Fretin (FR); Valentin Delrue, Fretin (FR); Yannick Allaert, Fretin (FR)

(73) Assignee: NACON, Fretin (FR)

( * ) Notice: Subject to any disclaimer, the term of this patent is extended or adjusted under 35 U.S.C. 154(b) by 0 days.

(21) Appl. No.: 17/287,701

(22) PCT Filed: Oct. 24, 2019

(86) PCT No.: PCT/EP2019/079016
§ 371 (c)(1),
(2) Date: Apr. 22, 2021

(87) PCT Pub. No.: WO2020/084044
PCT Pub. Date: Apr. 30, 2020

(65) Prior Publication Data
US 2021/0379488 A1    Dec. 9, 2021

(30) Foreign Application Priority Data
Oct. 25, 2018  (FR) ...................................... 1859851

(51) Int. Cl.
*A63F 13/24*  (2014.01)

(52) U.S. Cl.
CPC ...... *A63F 13/24* (2014.09); *A63F 2300/1043* (2013.01)

(58) Field of Classification Search
None
See application file for complete search history.

(56) References Cited

U.S. PATENT DOCUMENTS

| 5,883,690 | A | 3/1999 | Meyers | |
| 9,710,072 | B1 * | 7/2017 | Strahle | ..................... G06F 3/033 |
| 10,500,486 | B2 * | 12/2019 | Sidwell | ..................... A63F 13/24 |
| 2012/0274563 | A1 * | 11/2012 | Olsson | ..................... G05G 9/047 |
| | | | | 345/161 |

(Continued)

FOREIGN PATENT DOCUMENTS

WO    2018093328 A1    5/2018

OTHER PUBLICATIONS

Int'l Search Report for PCT/EP2019/079016, dated Jan. 29, 2020.

*Primary Examiner* — Tramar Harper
(74) *Attorney, Agent, or Firm* — Blue Filament Law PLLC

(57) ABSTRACT

A game controller (1) including an assembled shell (2) and at least one pivoting control member (3) which passes through the assembled shell (2) and can be tilted manually in all directions from a rest position into which it returns in a rotationally elastic manner. For each pivoting control member (3), the game controller includes at least one removable first head (32A) and one removable second head. The two removable heads have different dimensions so as to obtain different values for the stop angle of the control member (3) in relation to its rest position when the control member (3) is tilted in abutment in the stop position.

15 Claims, 9 Drawing Sheets

(56) References Cited

U.S. PATENT DOCUMENTS

| | | | |
|---|---|---|---|
| 2015/0194279 A1* | 7/2015 | Rubio | H01H 13/10 |
| | | | 200/331 |
| 2016/0346680 A1* | 12/2016 | Tsai | B29C 70/76 |
| 2016/0346681 A1* | 12/2016 | Tsai | A63F 13/24 |
| 2016/0361636 A1* | 12/2016 | Gassoway | A63F 13/98 |
| 2017/0001106 A1* | 1/2017 | Gassoway | A63F 13/24 |
| 2017/0304717 A1* | 10/2017 | Huang | G06F 3/0338 |
| 2017/0368452 A1* | 12/2017 | Tiffany | G05G 5/05 |
| 2018/0200617 A1* | 7/2018 | Tiffany | A63F 13/24 |
| 2018/0264355 A1* | 9/2018 | Burgess | A63F 13/24 |
| 2019/0270006 A1* | 9/2019 | Guerrero, Jr. | G05G 5/04 |
| 2021/0283495 A1* | 9/2021 | Wang | A63F 13/24 |

\* cited by examiner

GAME CONTROLLER COMPRISING AT LEAST ONE PIVOTING CONTROL MEMBER WITH A MODIFIABLE STOP ANGLE

TECHNICAL FIELD

The present invention relates to the field of game controllers comprising at least one pivoting control member, of the pivoting "stick" type, in particular of the "joystick" or "thumbstick" type, tiltable in all directions. In this field, it relates to an improvement allowing a user of the game controller to easily modify the responsiveness of the pivoting control member so as to better adapt the controller to the type of game controlled by the controller.

PRIOR ART

It is now common practice to control a video game using a game controller comprising at least one pivoting control member, of the analog pivoting stick type, in particular of the "joystick" or "thumbstick" type, tiltable in all directions.

Usually, the pivoting control member comprises a central rest position, in which it is elastically rotated, and is coupled to displacement sensors measuring the rotation of this member, relative to this rest position, about two perpendicular axes. The analog measurement signals delivered by these displacement sensors are automatically processed by software embedded in the game controller, so that manual actuation of this pivoting control member by the player makes it possible to interact with a video game, for example to move a character or an object in a video game.

More particularly, to control video games, it is now customary to use a game controller comprising two pivoting members, generally designated joysticks and sometimes also designated "thumbsticks", which can be actuated independently of one another, using the right and left thumbs, respectively, of a player holding the controller.

This type of game controller is described for example in the following publications: international patent applications WO2016/200548, WO2016/200615, WO2016/210586; U.S. Pat. Nos. 9,971,420, 9,710,072, 9,868,058.

In practice, such a game controller comprises an assembled shell, generally in the form of at least two half-shells assembled together by any means, for example by means of screws and/or by gluing and/or by welding. This shell is generally ergonomic so as to facilitate the gripping of the controller by a player.

The electronic control means of the controller are housed inside said assembled shell. These electronic control means comprise in particular:
- the aforementioned displacement sensors, one or more electronic memories,
- a processor which is capable of automatically executing embedded software, and which can be implemented for example by means of a microprocessor, a microcontroller, a programmable electronic circuit of the FPGA type or a specific electronic circuit of the ASIC type,
- the connectors allowing the processor to communicate with a game console or the like.

For each joystick-type pivoting control member, the shell of the game controller comprises an opening through which the pivoting control member is passed.

More particularly, each pivoting member comprises a pivoting base element which is passed through an opening in the shell, the lower end of which is housed inside the assembled shell and is coupled to the displacement sensors, and an ergonomic head for manipulating the pivoting control member, and for example a head whose upper surface may be domed in a concave or convex shape or may be flat.

Originally, the head and the pivoting base element were designed to form a monolithic unit made in one piece or in several pieces permanently assembled together.

More recently, in order in particular to allow a player to choose the control member head which suits him the best, game controller manufacturers have proposed game controllers with several easily interchangeable pivoting control member heads of the "joystick" type. On this subject, reference may be made to the aforementioned publications WO2016/200548 and WO2016/200615, which describe solutions for pivoting control members of the "joystick" type for a game controller, the head of which can be removably mounted on the pivoting base element; the means for assembling the head and the pivoting base element may be of the mechanical type only or at least in part of the magnetic type.

In the game controllers known to date, the pivoting control member of the "joystick" type can be tilted in rotation manually, from its rest position, and in all directions to an extreme position, hereinafter referred to as "stop position," in which the pivoting control member is in abutment and its tilting is blocked. This stop position for each tilting direction of the pivoting control member makes it possible to define a stop angle of the pivoting control member with respect to its rest position. When the user releases the pivoting control member, the latter is elastically returned in rotation to its rest position, by suitable mechanical return means of the return spring(s) type.

Generally, the rest position of the pivoting control member is a central position and the value of the stop angle of the pivoting control member is the same over 360° for all tilting directions of the control member and is on the order of 38°. It is nevertheless conceivable to provide a pivoting control member for a game controller having at least two different angle values for different tilting directions.

Depending on the type of game controller, the stop position of the pivoting control member can be obtained in different ways.

In a first known type of game controller, this stop position is obtained by using, as a lower rotation stop, the peripheral edge of the opening through which the pivoting control member has passed or the inner edge of an attached ring fastened at this opening and surrounding the pivoting control member.

In a second known type of game controller, described in particular in publications WO2016/200548 and WO2016/200615, this stop position is obtained by means of a dome-shaped part, which is fastened to the pivoting control member while being housed inside the shell of the game controller, and which is adapted to come into abutment with a part internal to the shell of the controller with an upper stop function. This upper stop is for example constituted by an inner part of the shell near the opening through which the pivoting control member has passed or by a part internal to the shell of an attached ring fastened at this opening and surrounding the pivoting control member.

With certain video games, and for example with fighting games, it is desirable for the player to be able to be as responsive as possible and to this end to have a more responsive game controller allowing him to bring the pivoting control member in the stop position in a tilted direction as quickly as possible. With other types of video games, the speed with which the pivoting control member is brought into the stop position is less critical and the game controller used may therefore be less responsive.

PURPOSE OF THE INVENTION

The main objective of the invention is thus to propose a new technical solution which allows a player to easily and quickly modify the responsiveness of a game controller, in particular to adapt it to different types of video games.

A more particular objective of the invention is to provide a new technical solution which allows a player to easily and quickly increase the responsiveness of a game controller, in particular to make it more suitable for use with fighting video games.

SUMMARY OF THE INVENTION

The object of the invention is thus a game controller comprising an assembled shell and at least one pivoting control member which is passed through the assembled shell and which can be tilted manually in all directions from a rest position into which it returns in a rotationally elastic manner.

Characteristically according to the invention, the control member comprises a pivoting shaft and at least a first head and a second head, which are suitable, each separately, of being removably assembled with the pivoting shaft without disassembling the shell of the game controller and of being disassembled from the pivoting shaft without disassembling the shell of the game controller, and which are adapted such that on the one hand the control member, comprising the first head or the second head assembled with the pivoting shaft, is capable to be tilted manually, for each tilting direction, to a stop position, in which said first head or said second head is in abutment and makes it possible to block the tilting of the control member with a stop angle ($\alpha$) with respect to the rest position, the value of the stop angle ($\alpha$) obtained with the first head being different from the value of the stop angle ($\alpha$) obtained for the same tilting direction with the second head.

More specifically, the game controller according to the invention may comprise the following additional and optional features, taken in isolation, or in combination with each other:
  the value of the stop angle ($\alpha$) of the control member with respect to its rest position is identical for all tilting directions of the control member.
  the or each head comprises a foot, the outer face of which forms a straight cylinder of circular cross-section over at least part of the height of the foot intended to come into abutment when the control member is tilted in the stop position.
  The game controller comprises at least two different removable heads, and preferably at least three different removable heads; each head comprises a foot, the outer face of which forms a straight cylinder of circular cross-section over at least part of the height of the foot intended to come into abutment when the control member is tilted in the stop position; the external diameters of said cylindrical parts of the outer faces of circular cross-section are different.
  the game controller comprises an inner edge, which surrounds the control member and which delimits an opening in the assembled shell through which the control member is positioned, and said inner edge acts as a bottom rotational stop when the control member is tilted in the stop position.
  the opening delimited by said inner edge is circular.
  the game controller comprises at least a first adjusting element comprising an inner edge and a second adjusting element comprising an inner edge, which first and second adjusting elements are able, each separately, to be removably assembled with the shell of the game controller, without disassembling said shell, so that their inner edge surrounds the control member, and are able to be removed from the game controller shell without disassembling said shell, and each adjusting element is adapted such that when it is assembled with the shell, the control member is able to be tilted manually, for each tilting direction, to a stop position, in which it abuts against the inner edge of said adjusting element which makes it possible to block the tilting of the control member with a stop angle ($\alpha$) with respect to the rest position, the value of the stop angle ($\alpha$) obtained with the first adjusting element being different from the value of the stop angle ($\alpha$) obtained for the same tilting direction with the second adjusting element.
  The game controller comprises at least two different removable adjusting elements, and preferably at least three different removable adjusting elements, the inner edge of each adjusting element defining an opening which is circular, and the diameters of these circular openings being different.
  the value of the stop angle ($\alpha$) of the control member (3) with respect to its rest position is less than 90° and preferably between 20° and 70°.
  part of the pivoting control member is housed and is fixed inside the assembled shell, and the game controller comprises sensors positioned inside the assembled shell and measuring the rotation of the pivoting control member.

Another object of the invention is also an assembly comprising at least two different removable heads, and preferably at least three different removable heads, which are each intended separately to form part of a control member of a game controller which is pivoting and which is able to be tilted manually in all directions from a rest position, in which assembly each removable head comprises a foot, the outer face of which forms a straight cylinder of circular cross-section over at least part of the height of the foot and in which the external diameters of said cylindrical parts of the outer faces of circular cross-section are different, so as to obtain, for all tilting directions of the pivoting control member, a stop angle ($\alpha$) with respect to said rest position having a different value with each head.

More particularly and optionally, said assembly may comprise at least two different removable adjusting elements, and preferably at least three different removable adjusting elements, which are each intended separately to be removably assembled with the shell of a game controller, which game controller further comprises at least one control member which is pivotable and which is able to be tilted manually in all directions from a rest position; each adjusting element comprises an inner edge which delimits a circular opening and which surrounds the control member when said adjusting element is assembled with the shell: the diameters of the circular openings of the adjusting elements are different, so as to obtain, for all tilting directions of the pivoting control member, a stop angle ($\alpha$) with respect to said rest position having a different value with each adjusting element.

Another object of the invention is also a method for adjusting the stop angle of the pivoting control member of an above-mentioned game controller. This method comprises removably assembling one of the heads with the pivoting shaft (300) of the control member without disassembling the shell of the game controller (1), such that the control member is able to be tilted manually for each tilting direction to a stop position, in which the head of the control member is in abutment and makes it possible to block the tilting of the control member (3).

More particularly and optionally, said method can comprise the removable assembly of one of the adjusting elements with the shell of the game controller, without disassembling the shell of the game controller, and such that the control member is able to be tilted manually for each tilting direction to a stop position, in which the control member is in abutment against said adjusting element which makes it possible to block the tilting of the control member.

BRIEF DESCRIPTION OF THE DRAWINGS

The features and advantages of the invention will become apparent from reading the detailed description below of several particular embodiments of the invention, which particular embodiments are described as non-limiting and non-exhaustive examples of the invention, and with reference to the accompanying drawings in which.

DETAILED DESCRIPTION

Figure 1:
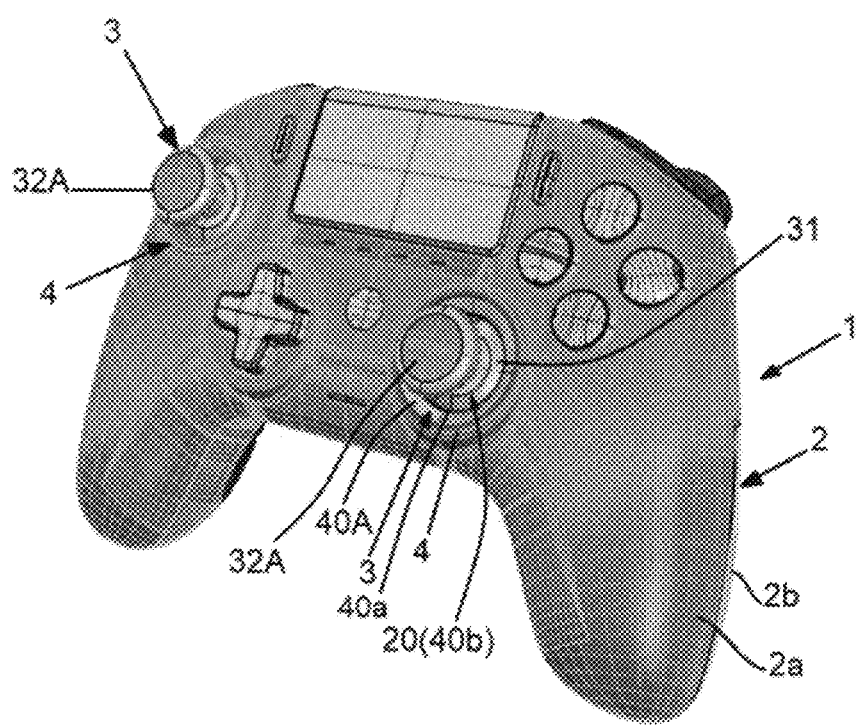
FIG. 1 is an isometric perspective view of a variant embodiment of a game controller according to the invention.

FIG. 1 shows a particular example of a game controller 1 comprising an assembled shell 2, and control means in particular comprising two pivoting control members 3: a pivoting member 3 located in the left part of the game controller 1 and a pivoting member 3 located in the right part of the game controller 1.

The assembled shell 2 comprises, in a manner known per se, an upper half-shell 2a, which is assembled by any means, for example mechanically by means of screws or the like and/or by gluing and/or by welding, with a lower half-shell 2b.

In this particular example, the assembled shell 2 more particularly has an ergonomic shape adapted to facilitate gripping thereof with both hands by a player.

Each pivoting member 3 is passed through an opening 20 of the upper half-shell 2a, more particularly a circular opening 20.

Figure 3:
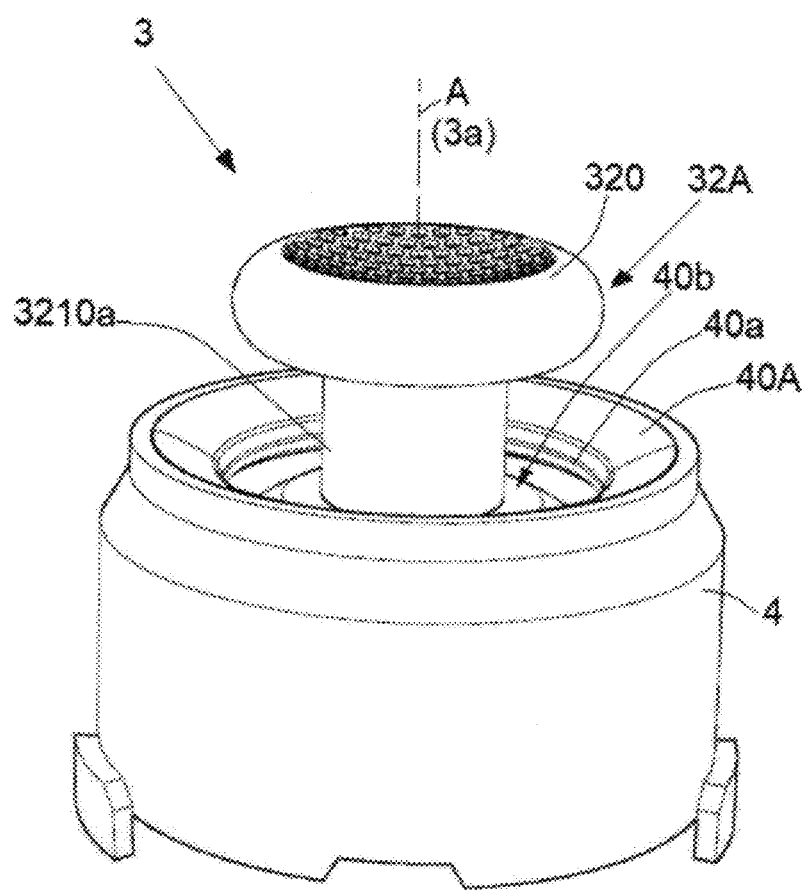
FIG. 3 is an isometric view of the pivoting control member of FIG. 2, after the pivoting control member is assembled and mounted through the opening of a cylindrical insert secured through the shell of the game controller, the shell of the game controller not being shown in this FIG. 3, the pivoting control member being in its rest position, and the insert comprising a ring in the upper part, which surrounds the pivoting control member.

More particularly in this specific embodiment, with reference to FIGS. 1 and 3, and in a nonlimiting manner relative to the invention, at each circular opening 20 of the upper half-shell 2a, the game controller 1 comprises a cylindrical tubular insert 4, which is mounted in an opening 20 of the upper half-shell 2a of the controller 2, and is fastened to the upper half-shell 2a. The upper part of this insert 4 is provided with a ring 40A whose inner edge 40a delimits a circular opening 40b (FIG. 3) of smaller diameter than the diameter of the opening 20 of the shell 2. When this tubular insert 4 is mounted and is fastened in a circular opening 20 of the upper half-shell 2a of the game controller 1, the circular opening 40b of this tubular insert 4 is centered relative to this opening 20.

In another variant embodiment, the game controller may not comprise such a tubular insert 4, and/or may not comprise a ring 40A. In the absence of ring 40A, the aforementioned inner edge 40a is replaced by the inner edge of the opening 20 in the upper half-shell 2a of the game controller. In another variant embodiment, the ring 40A can be an integral part of the upper half-shell 2a or be an add-on part, which can be fixed permanently or removably to the tubular insert 4 or directly at the opening 20 of the upper half-shell 2a.

In the particular embodiment of FIG. 1, each pivoting member 3 is of the "joystick" type, and is positioned near the edge of the shell 2, so as to be able to be easily manipulated by the left thumb or the right thumb of a player holding the game controller.

Each pivoting control member 3 of the game controller 1 is formed by a monolithic assembly of several elements 30, 31, 32A, which will now be described with reference to FIGS. 2 and 4.

Pivoting Control Member 3

The element 30 (FIG. 2) of each pivoting control member 3 is a base element which is intended to be mounted and fixed permanently with respect to the shell 2 of the game controller. This base element 30 of each pivoting control member 3 is known and will therefore be described briefly below.

Figure 2:
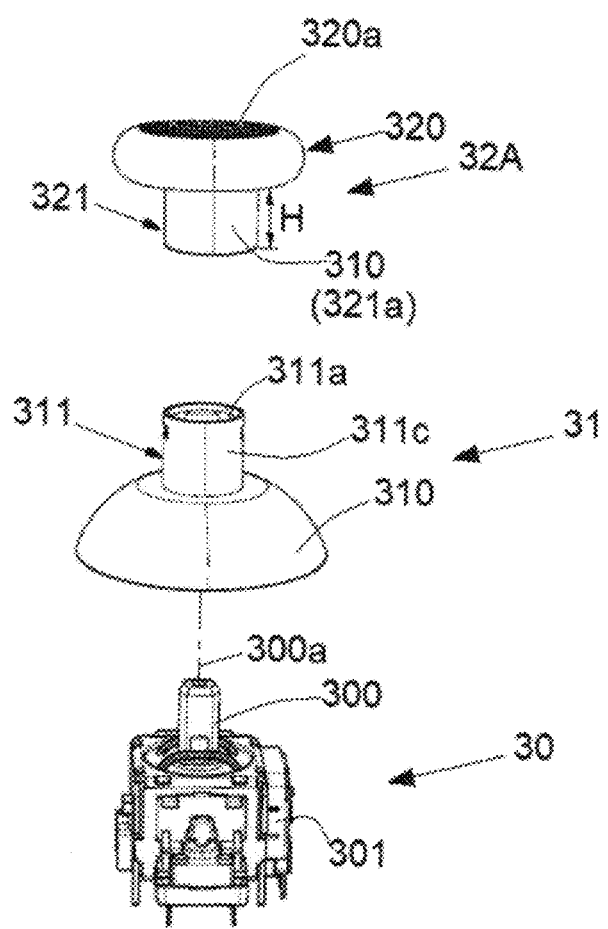
FIG. 2 is an exploded view of an embodiment of a pivoting control member of the game controller of FIG. 1.

With reference to FIG. 2, this base element 30 comprises a cylindrical shaft ("stick") 300, with a central axis 300a, which is mounted to pivot relative to a casing 301. This pivoting cylindrical shaft 300 is able to be tilted manually with respect to the casing 301, in all directions, from a central rest position, illustrated in FIGS. 1 and 2, into which it returns in a rotationally elastic manner. The means for elastically rotating into the central rest position of this shaft 300 are known and will therefore not be described in detail. These elastic return means, of the spring type, are housed inside the casing 301.

This pivoting shaft 300 is also, and in the usual manner, coupled to analog displacement sensors, for example potentiometer-type sensors, which are housed inside the casing 301, and which make it possible to measure the angles of rotation of this shaft 300, respectively about two reference axes of rotation, which are perpendicular to each other and which define a plane perpendicular to the central axis 300*a* of the shaft 300 in its rest position in FIG. 2. In a known manner, these sensors deliver analog measurement signals which are characteristic of the instantaneous value of the angle formed by the central axis 300*a* of the shaft 300, about each reference axis of rotation, with respect to the rest position of this axis 300*a*.

The base element 30 is mounted and fastened to the inside of the shell 2 of the game controller 1, so that on the one hand its casing 301 is fully housed inside the assembled shell 2 and is fastened to the assembled shell 2, and on the other hand its pivoting shaft 300 is positioned perpendicular to the circular opening 40*b* of the ring 40 of the insert 4 described above and is centered with respect to this circular opening 40*b*.

The element 31 of each pivoting control member 3 is a protective part which is symmetrical and rigid, and which comprises:

in the lower part, a dome-shaped cup 310
and
in the upper part, a cylindrical assembly end piece 311, which is centered relative to the lower cup 310, the central axis of symmetry of the cup 310 being coincident with the central axis of symmetry of this cylindrical end piece 311.

More particularly, the cylindrical assembly end piece 311 comprises a cavity 311*a* (FIGS. 2 and 4) which is open at the top and which is delimited by a bottom wall 311*b* and a side wall 311*c*, which is preferably cylindrical. The bottom wall comprises (FIG. 3) a projecting central lug 311*d*. The side wall 311*c* comprises preferably diametrically opposed assembly slots 311*e*.

Referring to FIG. 3, the protective element 31 further comprises, in its lower part, a central cylindrical housing 312. This central cylindrical housing 312 is dimensioned so as to allow a tight fitting in this housing 312 of the pivoting shaft 300 of the base element 30. The cross-section of this cylindrical housing 312 and the cross-section of the pivoting shaft 300 are not circular and are chosen so as to allow the pivoting shaft 300 to be blocked in rotation about its central axis in this housing 312. The element 31 is mounted simply by axially fitting the element 31 onto the pivoting shaft 300 of the base element 30.

The cup 310 of the protective element 31 is dimensioned such that its maximum external diameter is greater than the diameter of the opening 40*b* of the ring 40 of the insert 4. The cup of the element 31 makes it possible to partially close the opening 40*b* of the insert 4, without hindering the pivoting of the shaft 300 of the base element 30, which makes it possible in particular to avoid the accidental introduction of foreign bodies or elements inside the assembled shell 2 and also makes it possible to improve the aesthetic appearance of the game controller 1.

The element 32A constitutes the head of the pivoting control member 3 and, once mounted, is positioned (FIG. 1) on the outside of the assembled shell. This head 32A has a geometry and dimensions suitable for the manipulation by a player of the pivoting control member 3, preferably using one of his two thumbs.

More particularly, this head 32A is removable so that it can be easily and quickly mounted or removed by a user, in particular without having to disassemble the shell 2 from the game controller 1.

In this particular example, this head 32A is a single piece, for example made of injected plastic.

This head 32 comprises a substantially disc-shaped upper part 320 and a lower cylindrical part 321, with height H, which is oriented perpendicular to said disc-shaped upper part 320, and which is centered with respect to said disc-shaped upper part 320. This cylindrical lower part 321 forms the foot of the head 32A.

In another variant embodiment, the substantially disc-shaped upper part 320 and the cylindrical foot 321 could be two sub-elements assembled together by any means, in a permanent and robust manner.

Figure 4:
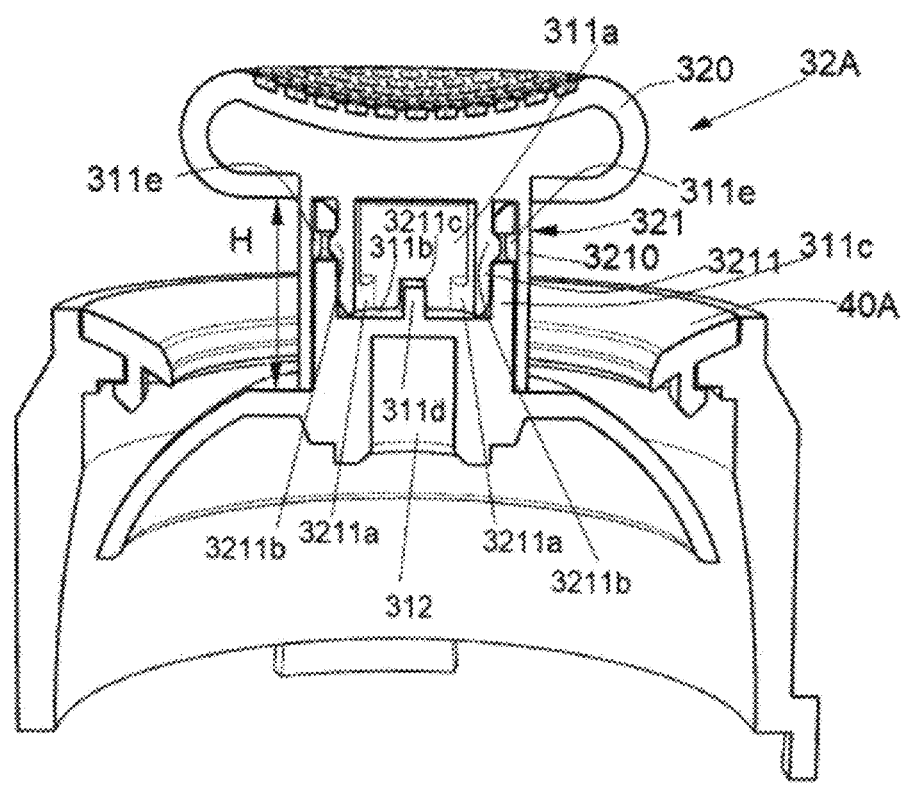
FIG. 4 is a cross-sectional view of the assembly of FIG. 3.

The upper face 320*a* of the head 32A can for example be curved and concave as illustrated in FIG. 4. In another variant, the upper face 320*a* of the head 32A may for example be domed and convex or may be planar.

The cylindrical foot 321 of the head 32 comprises a cylindrical outer part 3210 and an inner part 3211, positioned inside the cylindrical outer part 3210.

More particularly, the cylindrical outer part 3210 of the foot 321 comprises an outer face 3210*a*, which forms, over the entire height H of the foot 321, a straight cylinder of circular cross-section.

In another variant embodiment, this outer face 3210*a* could form a straight cylinder of circular cross-section only over part of the height H of the foot 321.

The internal section of this outer part 3210 of the foot 321 is chosen so as to allow the mounting of this outer part 3210 on the assembly end piece 311 of the element 31 with a minimum clearance that is just sufficient to allow guided axial sliding of the cylindrical outer part 3210 on the assembly end piece 311 of the element 31.

As will appear more clearly later, the choice of the external diameter of this outer part 3210 of the foot 321 allows adjustment of the stop angle of the pivoting control member 3

The inner part 3211 of the foot 321 comprises diametrically opposed legs 3211*a*, which are each provided with an external assembly lug 3211*b*. Each assembly lug 3211*b* can be pressed in under the action of a mechanical stress and can, in the absence of a mechanical stress, elastically return to its rest position of FIG. 2, in which it protrudes toward the outside of the leg 3211*a*. The inner part 3211 of the foot 321 also comprises a lower slit 3211*c* adapted to the geometry of the lug 311*d* of the protective part 31.

To assemble the head 32A with the protective element 31 (FIG. 3), it suffices to insert the inner part 3211 of the cylindrical foot 321 of the head 32 axially by hand into the cylindrical cavity 311*a* of the cylindrical assembly end piece 311 of the protective element 31, until the lug 311*d* protruding in the bottom of the cylindrical cavity 311*a* enters the slit 3211*c*, which ultimately makes it possible to obtain a blocking in rotation of the head 32A relative to the protective element 31. During this axial insertion, a slight depression of each lug 3211*b* is obtained toward the interior of the legs 3211*a* until each lug 3211*b* is positioned opposite an assembly slot 311*e* of the cylindrical assembly end piece 311 and enters this assembly slot 311*e* (configuration of FIG. 3), which allows axial blocking of the head 32A relative to the protective element 31.

The flexural elasticity of the assembly lugs 3211*b* further allows radial clamping of the cylindrical inner part 3211 of the head 32A relative to the cylindrical assembly end piece 311. This radial clamping is strong enough to prevent accidental dislocation of the head 32A relative to the protective element 31. However, this radial clamping is weak enough to allow a user to intentionally dislodge the head 32A from the protective element 31, by pulling axially by hand and with sufficient force on the head 32A, so as to obtain, under the effect of this axial traction, a depression of the assembly lugs 3211b toward the interior of the legs 3211a which is sufficient to cause the lugs 3211b to leave their respective assembly slots 311e.

The head 32A can thus be easily and quickly removably fitted by hand by a player on the protective element 31 or be easily and quickly removed by hand by a player, without having to disassemble the shell 2 from the game controller 1.

Mounting and Assembly of the Pivoting Member

The mounting and assembly of a pivoting member 3 is carried out for example by proceeding as follows.

Each base element 30 assembled with the associated protective element 31 is fastened in one of the upper 2a or lower 2b half-shells at a predefined location and is electrically connected to an electronic control circuit of the game controller intended to be housed inside the shell 2.

This electronic control circuit in particular allows the automatic processing of the measurement signals delivered by the rotational displacement sensors of the pivoting control member 3. This electronic control circuit can comprise one or more electronic memories, a processor which is capable of automatically executing embedded software, and which can be implemented for example by means of a microprocessor, a microcontroller, a programmable electronic circuit of the FPGA type or a specific electronic circuit of the ASIC type, and one or more connectors allowing the processor to communicate with a game console or the like.

Then, the upper half-shell 2a provided with a tubular insert 4 at each opening 20 is positioned on the lower half-shell 2b, such that the shaft 300 of each pivoting control member 30, in its central rest position and carrying the protective element 31, is oriented perpendicularly relative to the circular opening 40b of the tubular insert 4 and is centered relative to this circular opening 40b. Finally, the two half-shells 2a, 2b are assembled together, for example by means of screws.

Once the two half-shells 2a, 2b are assembled to form the shell 2 of the game controller 1, as shown in FIG. 3, the cylindrical assembly end piece 311 of the protective element 31, which is also centered with respect to the circular opening 40b of the tubular insert 4, is preferably passed through the opening 40b of the insert and protrudes outside the assembled shell 2, so that it is at least in part located and easily accessible outside the assembled shell 2.

The aforementioned assembly steps are carried out in the factory.

The user can easily and quickly fix the head 32A on the protective element 31 by axially and removably fitting this head 32A onto the cylindrical assembly end piece 311 of the protective element 31.

Stop Angle of the Pivoting Control Member 3

The central axis of symmetry of the tubular insert 4 is referenced A in FIG. 3, that is to say, in this particular embodiment, the central axis of symmetry of the circular opening 40b delimited in the shell 2 assembled by the inner edge 40a of the upper ring 40A of this insert 4.

In this FIG. 3, the pivoting control member 3 is in its central rest position, its axis of symmetry 3a being, in this central rest position, coincident with the central axis of symmetry A of the circular opening 40b.

As described above, the user of the game controller 1 can manually rotate this control member 3 in all directions by tilting it relative to the central rest position of FIG. 3. When the user of the game controller 1 releases this control member 3, the latter elastically returns to its central rest position in FIG. 3.

Figure 5:
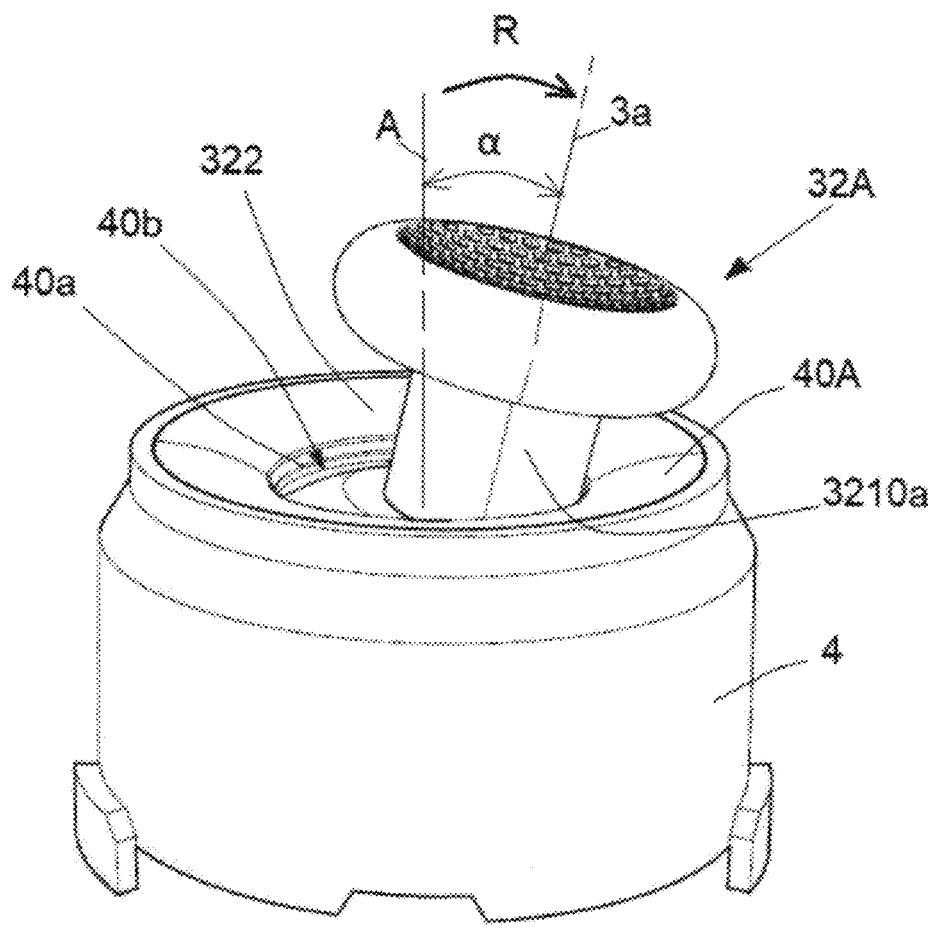
FIG. 5 is an isometric view of the assembly of FIG. 3, with the control member tilted to the stop position.
Figure 6:
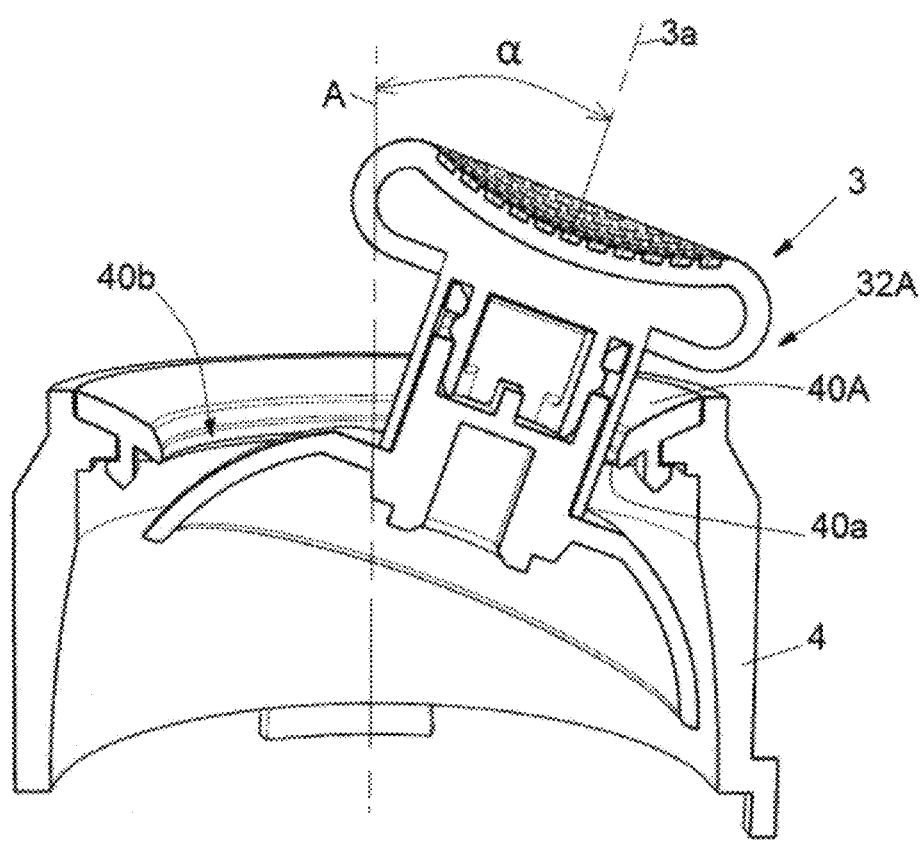
FIG. 6 is a cross-sectional view of the assembly of FIG. 5.

Whatever its tilting direction, the control member 3 (FIG. 5/rotation R) can be tilted until it reaches a stop position, for example such as that in FIG. 5. In this stop position, the cylindrical outer face 3210a of the foot 321 is in abutment and the tilting of the pivoting control member 3 is thus blocked in this stop position. The cylindrical outer face 3210a of the foot 321 thus makes it possible to adjust the maximum travel of the tilting of the pivoting control member 3.

In the particular case of FIG. 5, the inner edge 40a of the ring 40A surrounds the control member 3 over its entire periphery. In the stop position of the control member 3, the control member 3 abuts against the inner edge 40a of the ring 40A by means of the foot 321 of the head 32, the inner edge 40a of the ring 40A fulfilling a low rotational stop function.

The stop position of the control member 3 is characterized by a stop angle $\alpha$ (FIG. 5), which corresponds to the maximum angle formed by the two central axes of symmetry A and 3a for a given tilting direction of the control member 3.

In the embodiment of the appended figures, but in a non-limiting manner with respect to the invention, the value of the stop angle $\alpha$ is preferably the same for all the tilting directions of the control member 3.

In another variant embodiment, the value of the stop angle $\alpha$ may be different for at least two different tilting directions of the control member 3 and/or the geometry of the opening 40b is not necessarily circular, but may for example be of the polygonal type or of the elliptical type and/or the rest position is not necessarily a central position and/or the cross-section of cylindrical outer face 3210a of the foot 321 is not necessarily circular, but may for example be of the polygonal type or of the elliptical type Typically, the value of the stop angle of the pivoting control member 3 of a game controller is less than 90° and generally between 20° and 70°.

$1^{st}$ Variant: Adjustment of the Stop Angle by Selecting the Head (32A, 32B or 32C) of the Control Member (3)

Figure 7:
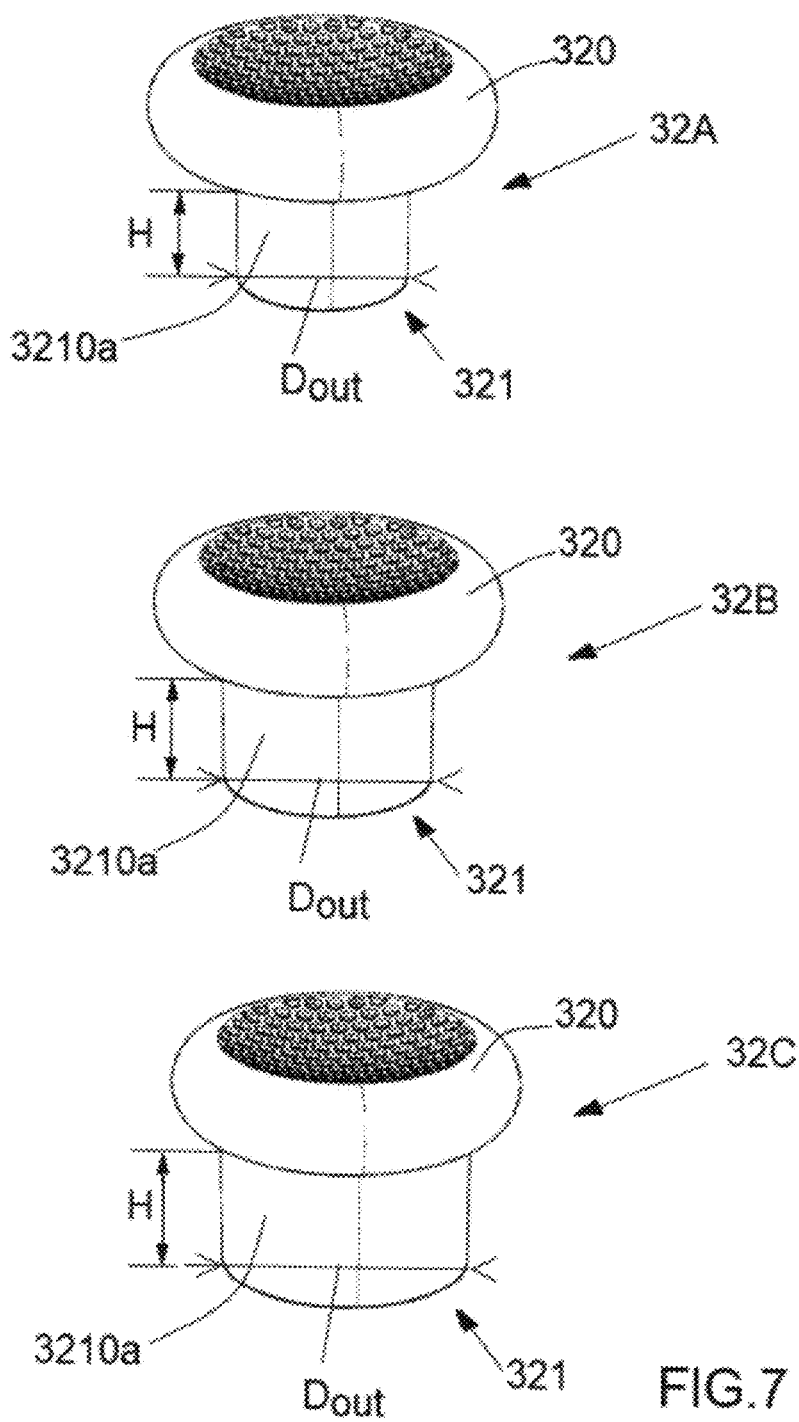
FIG. 7 shows a set of three removable heads making it possible to obtain three different respective settings of the stop angle of the pivoting control member of the game controller.

In an alternative embodiment of the invention, the user of the game controller 1 has several different removable heads (at least two different heads per pivoting control member) at his disposal, such as for example the aforementioned removable head 32A and the removable heads referenced 32B and 32C in FIG. 7.

These removable heads 32A, 32B and 32C have feet 321 whose inner parts 3211 are identical and whose outer parts 3210 have the same internal section, and in particular the same internal diameters, in order to allow the elastic and removable fitting of each head 32A, 32B, 32C on the same protective element 31. The feet 321 of the removable heads 32A, 32B and 32C preferably have the same height H.

Conversely, the external diameters $D_{out}$ of the cylindrical outer face 3210a of the feet 321 of the removable heads 32A, 32B and 32C are different, for example by using cylindrical outer parts 3210 of different thicknesses.

The value of the stop angle $\alpha$ of the control member 3 depends on the external diameter $D_{out}$ of the foot 321 of the removable head 32A, 32B or 32C used. The larger this external diameter, the smaller the value of the stop angle $\alpha$ will be, and vice versa.

In the particular example of FIG. 7, the head 32A has the smallest external diameter $D_{out}$. This head 32A makes it possible to obtain the largest stop angle value a and for example allows a stop angle of 46°.

The head 32C has the largest external diameter $D_{out}$. This head 32C makes it possible to obtain the smallest stop angle value a and for example allows a stop angle of 30°.

The head 32b has an external diameter $D_{out}$ between the external diameters $D_{out}$ of the heads 32A and 32C and thus makes it possible to obtain an intermediate stop angle value a and for example a stop angle α of 38°.

The lower the value of the stop angle α, the greater the responsiveness of the pivoting control member 3 of the game controller and vice versa.

Owing to the removable heads 32A, 32B, 32C, the user of the controller can advantageously adjust the responsiveness of a pivoting control member 3 of his game controller 1 very easily and very quickly, in particular to make this responsiveness more suited to the type of game he wishes to play. All he has to do is choose the head 32A, 32B, 32C whose external diameter $D_{out}$ corresponds to the responsiveness desired by the user for the pivoting control member 3 and adapt this removable head to the game controller 1, without having to disassemble the assembled shell 2 from the game controller 1.

Thus, when the user of the game controller wishes to have a more responsive controller, for example to play a fighting game, he can choose to equip his game controller 1 with the removable head 32C making it possible to obtain the smallest stop angle α. When the user of the game controller wishes to have a less responsive controller, he can choose to equip his game controller 1 with the removable head 32A or 32B making it possible to obtain larger stop angle values α.

This first variant (several removable heads) can be implemented with a ring 40A which is not removable, and which is fixed permanently to the shell 2 of the game controller 1, for example by being fixed permanently to the insert 4 or as an integral part of this insert 4.

$2^{nd}$ Variant: Additional Adjustment of the Stop Angle by Selecting a Removable Ring (40A, 40B)

Figure 8:
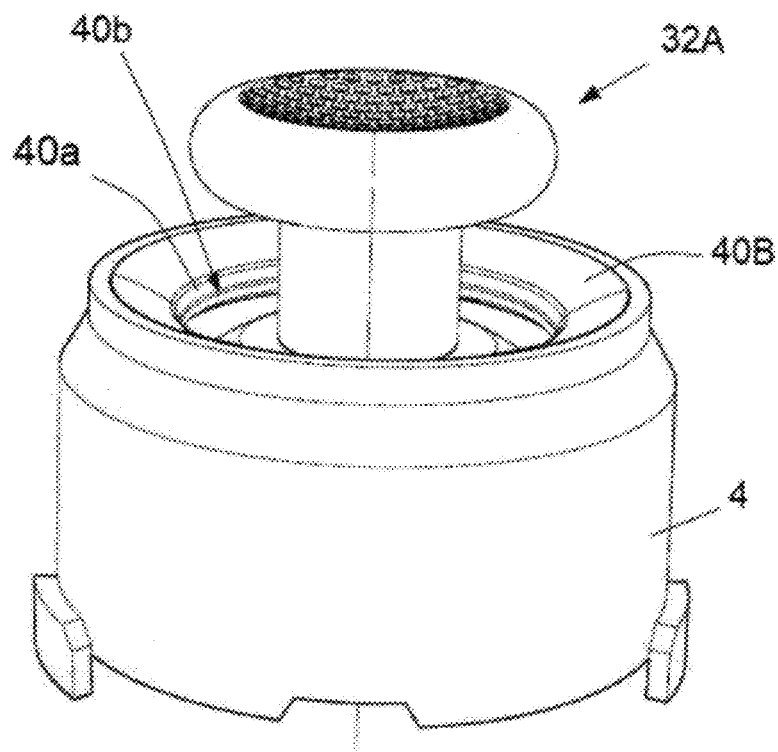
FIG. 8 is an isometric view of the pivoting control member of FIG. 2, once the pivoting control member has been assembled and mounted through the opening of a cylindrical insert secured through the shell (not shown in this figure) of the game controller, the pivoting control member being in its rest position, and the insert comprising a ring in the upper part, which surrounds the pivoting control member and whose internal diameter is greater than that of FIG. 3.
Figure 9:
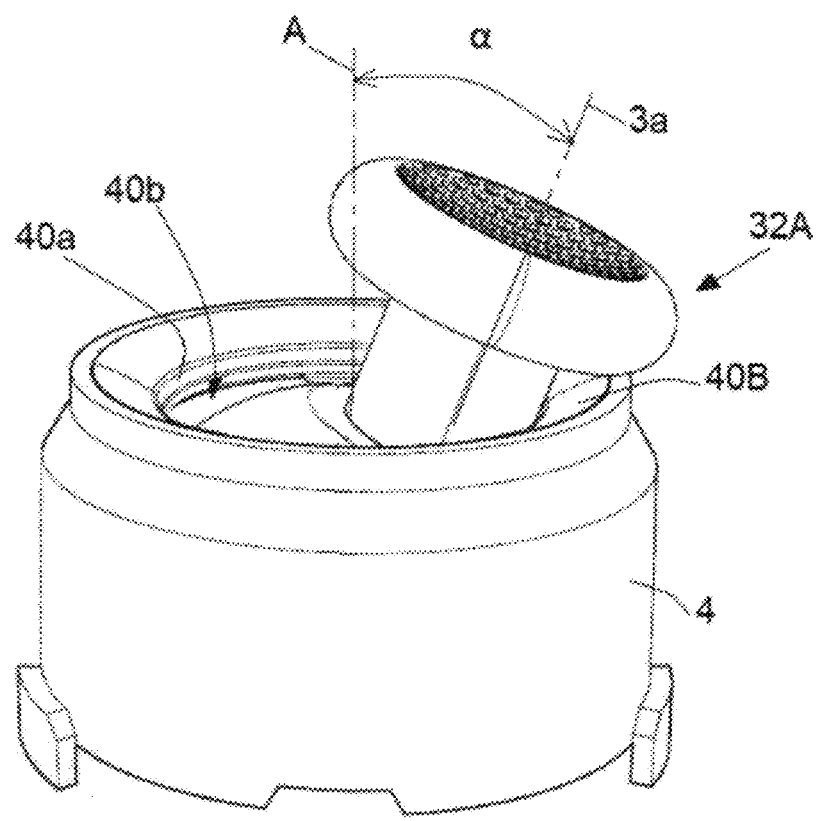
FIG. 9 is an isometric view of the assembly of FIG. 8, with the control member tilted to the stop position.

In a second variant embodiment, the user of the game controller 1 has at his disposal, in addition to the heads 32A, 32B or 32C, several different rings (at least two different rings per pivoting control member 3), such as for example the ring 40A described above and illustrated in FIGS. 3 to 6, and the ring 40B illustrated in FIGS. 8 and 9.

In the case of this second variant, each ring 40A, 40B is able to be removably fixed, and in particular to be fitted, on the shell 2 of the controller, and more particularly on the insert 4, without disassembling the shell 2, and can also be removed without disassembling the shell 2.

The interior sections of the rings 40A and 40B are different, and more particularly in the specific case of the appended figures, the inner edge 40a of the ring 40A defines a circular opening 40b (FIGS. 3 and 4), the diameter of which (FIGS. 8 and 9) is smaller than the diameter of the circular opening 40b delimited by the inner edge 40a of the ring 40A.

The value of the stop angle α of the control member 3 depends on the internal diameter of this circular opening 40b delimited by the inner edge 40a of the ring 40A or 40B. The smaller this internal diameter is, the smaller the value of the stop angle α will be, and vice versa.

It follows that by using the same head for the control member (for example the head 32A in FIGS. 3, 4, 8 and 9), with the ring 40A of smaller internal diameter, for each tilting direction of the control member a stop angle α (FIGS. 5 and 6) is obtained whose value is less than that of the stop angle α (FIG. 9) obtained for this same tilting direction with the ring 40B of larger internal diameter.

Owing to the implementation of removable rings 40A, 40B of different internal diameters, the user of the controller can advantageously adjust the responsiveness of a pivoting control member 3 of his game controller 1 very easily and very quickly, in particular to make this responsiveness more suited to the type of game he wishes to play. All he has to do is choose the ring 40A or 40B whose internal diameter corresponds to the responsiveness desired by the user for the pivoting control member 3 and mount this removable ring 40A or 40B on the shell 2 of the game controller 1, without having to disassemble the shell 2 from the game controller 1.

More particularly, it is possible for example to implement three different removable rings dimensioned so as to obtain three different respective stop angle values for each head used.

In this case, the number of possibilities for the values of the stop angle α is advantageously increased.

Other Variant Embodiments (Non-Exhaustive List)

The invention is not limited to the particular variant embodiment of the appended figures.

In particular, and in a non-exhaustive manner, the invention is not limited to the particular structure and to the particular dimensions of the heads 32A, 32B, 32C illustrated in the appended figures.

The head 32A, 32B, 32C is not necessarily specifically adapted to be manipulated by means of a thumb of the hand, the invention extending more generally to any pivoting control member 3 that can be manipulated manually, whatever in particular the structure, the geometry, the dimensions and the constituent materials of the head 32A, 32B, 32C of the control member 3. For example, the control member 3 can be a pivoting "stick" of the "joystick" type which can be grasped with two fingers of one hand or with the whole hand.

When the head 32A, 32B, 32C is removable, the means for assembling the head with the base element 30 may be different from those which have been previously described, the removable head for example being able to be screwed on or assembled by means of magnets or the like.

The protective element 31 of the variant of the appended figures is optional and could be omitted. In this case, the head of the pivoting control member 3 can be mounted directly on the pivoting shaft 300 of the base element 30, without an intermediate part 31.

In the invention, the ring 40A or 40B is an element for adjusting the stop angle α comprising an inner edge which delimits an opening 40b which is circular.

In another variant, this opening 40b may not be circular, and may for example be of the polygonal or elliptical type.

The insert 4 in the variants of the appended figures is optional and could be omitted. In this case, the ring 40A or 40B can be fixed directly, as the case may be permanently or removably, on the edge of an opening in the shell 2 of the game controller. Also, when it is not removable, this ring 40A or 40B can be an integral part of the shell 2 of the game controller 1.

The invention claimed is:

1. A game controller (1) comprising an assembled shell (2) and at least one pivoting control member (3) which is passed through the assembled shell (2) and which is able to be tilted manually in all directions from a rest position into which it returns in a rotationally elastic manner, characterized in that the control member (3) comprises a pivoting shaft (300) and at least a first head (32A) and a second head (32B), which are suitable, each separately, for being removably assembled with the pivoting shaft (300) without disassembling the shell (2) from the game controller (1) and for being disassembled from the pivoting shaft (300) without disassembling the shell (2) from the game controller (1), and which are configured such that on the one hand the control member (3), comprising the first head or the second head assembled with the pivoting shaft (300), is configured to be tilted manually, for each tilting direction, to a stop position, in which said first head or said second head is in abutment and makes it possible to block the tilting of the control member (3) with a stop angle ($\alpha$) with respect to the rest position, the value of the stop angle ($\alpha$) obtained with the first head being different from the value of the stop angle ($\alpha$) obtained for the same tilting direction with the second head.

2. The game controller according to claim 1, wherein the value of the stop angle ($\alpha$) of the control member (3) with respect to its rest position is identical for all tilting directions of the control member (3).

3. The game controller according to claim 1, wherein each head (32A, 32B, 32C) comprises a foot (321), the outer face (3210a) of which forms a straight cylinder of circular cross-section over at least part of the height (H) of the foot (321) intended to come into abutment when the control member (3) is tilted in the stop position.

4. The game controller according to claim 1, further comprising at least two different removable heads (32A/32B; 32A/32C; 32B/32C), wherein each of the at least two different removable heads (32A/32B; 32A/32C; 32B/32C) comprises a foot (321), the outer face (3210a) of which forms a straight cylinder of circular cross-section over at least part of the height (H) of the foot (321) intended to come into abutment when the control member (3) is tilted in the stop position, and wherein the external diameters ($D_{out}$) of said cylindrical parts of the outer faces (3210a) of circular cross-section are different.

5. The game controller according to claim 4 wherein the at least two different removable heads (32A/32B; 32A/32C; 32B/32C), are at least three different removable heads (32A; 32B; 32C), wherein each of the at least three different removable heads (32A/32B; 32A/32C; 32B/32C) comprises a foot (321), the outer face (3210a) of which forms a straight cylinder of circular cross-section over at least part of the height (H) of the foot (321) intended to come into abutment when the control member (3) is tilted in the stop position, and wherein the external diameters ($D_{out}$) of said cylindrical parts of the outer faces (3210a) of circular cross-section are different.

6. The game controller according to claim 1, further comprising an inner edge (40a), which surrounds the control member (3) and which delimits an opening (40b) in the assembled shell (2) through which the control member (3) is positioned, and said inner edge (40a) acts as a bottom rotational stop when the control member (3) is tilted in the stop position.

7. The game controller according to claim 6, wherein the opening (40b) delimited by said inner edge (40a) is circular.

8. The game controller according to claim 1, further comprising at least a first adjusting element (40A) comprising an inner edge (40a) and a second adjusting element (40B) comprising an inner edge (40a), which first and second adjusting elements (40A; 40B) are able, each separately, to be removably assembled with the shell (2) of the game controller (1), without disassembling said shell (2), so that their inner edge (40a) surrounds the control member (3), and are able to be removed from the game controller (1) without disassembling said shell (2), and each adjusting element (40A; 40B) is adapted such that when it is assembled with the shell (2), the control member (3) is able to be tilted manually, for each tilting direction, to a stop position, in which it abuts against said inner edge (40a) of said adjusting element (40A; 40B) which makes it possible to block the tilting of the control member (3) with a stop angle ($\alpha$) with respect to the rest position, the value of the stop angle ($\alpha$) obtained with the first adjusting element (40A) being different from the value of the stop angle ($\alpha$) obtained for the same tilting direction with the second adjusting element (40B).

9. The game controller according to claim 8, wherein said at least two different removable adjusting elements (40A; 40B), said inner edge (40a) of each of the at least two different removable adjusting elements (40A; 40B) defining an opening (40b) which is circular, and the diameters of these circular openings (40b) being different.

10. The game controller according to claim 9, wherein the at least two different removable adjusting elements (40A; 40B) are at least three different removable adjusting elements, said inner edge (40a) of each adjusting element of the at least three different removable adjusting elements (40A; 40B) defining an opening (40b) which is circular, and the diameters of these circular openings (40b) being different.

11. The game controller according to claim 1, wherein the value of the stop angle ($\alpha$) of the control member (3) with respect to its rest position is less than 90°.

12. The game controller according to claim 1, further comprising a part (30) of the pivoting control member (3) that is housed and is fastened inside the assembled shell (2), and the game controller comprises sensors positioned inside the assembled shell (2) and measuring the rotation of the pivoting control member (3).

13. A game controller (1) assembly comprising an assembled shell (2) and at least one pivoting control member (3) which is passed through the assembled shell (2) and which is able to be tilted manually in all directions from a rest position into which it returns in a rotationally elastic manner, said assembly comprising at least two different removable heads (32A/32B; 32A/32C; 32B/32C), which are each intended separately to form part of the at least one pivoting control member (3) of the game controller (1) which is also able to be tilted manually in all directions from a rest position, in which each removable head (32A, 32B, 32C) comprises a foot (321), the outer face (3210a) of which forms a straight cylinder of circular cross-section over at least part of the height (H) of the foot (321) and in which the external diameters ($D_{out}$) of said cylindrical parts of the outer faces (3210a) of circular cross-section are different, so as to obtain, for all tilting directions of the at least one pivoting control member (3), a stop angle ($\alpha$) with respect to said rest position having a different value with each head.

14. The game controller assembly according to claim 13, further comprising at least two different removable adjusting elements (40A; 40B), which are each intended separately to be removably assembled with the shell (2) of the game controller (1), each adjusting element (40A; 40B) comprises an inner edge (40a) which delimits a circular opening (40b) and which surrounds the at least one control member (3) when said adjusting element is assembled with the shell (2), and wherein the diameters of the circular openings (40b) of the adjusting elements (40A; 40B) are different, so as to obtain, for all tilting directions of the at least one pivoting control member (3), a stop angle ($\alpha$) with respect to said rest position having a different value with each adjusting element.

15. The game controller assembly according to claim 14, wherein the at least two different removable adjusting elements (40A; 40B), are at least three different removable adjusting elements, which are each intended separately to be removably assembled with the shell (2) of the game controller (1), each of the at least three different removable adjusting elements comprises an inner edge (40*a*) which delimits a circular opening (40*b*) and which surrounds the control member (3) when said adjusting element is assembled with the shell (2), and wherein the diameters of the circular openings (40*b*) of the at least three different removable adjusting elements are different, so as to obtain, for all tilting directions of the pivoting control member (3), a stop angle ($\alpha$) with respect to said rest position having a different value with each adjusting element.

* * * * *